(12) United States Patent
Tuffile et al.

(10) Patent No.: US 10,851,445 B2
(45) Date of Patent: Dec. 1, 2020

(54) LAYERED CONSTRUCTION OF IN-SITU METAL MATRIX COMPOSITES

(71) Applicant: The NanoSteel Company, Inc., Providence, RI (US)

(72) Inventors: Charles D. Tuffile, Dighton, MA (US); Harald Lemke, Northport, NY (US); Patrick E. Mack, Milford, MA (US)

(73) Assignee: The NanoSteel Company, Inc., Providence, RI (US)

( * ) Notice: Subject to any disclaimer, the term of this patent is extended or adjusted under 35 U.S.C. 154(b) by 98 days.

(21) Appl. No.: 15/342,078

(22) Filed: Nov. 2, 2016

(65) Prior Publication Data

US 2017/0121798 A1     May 4, 2017

Related U.S. Application Data

(60) Provisional application No. 62/249,642, filed on Nov. 2, 2015.

(51) Int. Cl.

| | | |
|---|---|---|
| *C22C 38/58* | (2006.01) | |
| *B23K 15/00* | (2006.01) | |
| *B23K 26/00* | (2014.01) | |
| *B23K 26/342* | (2014.01) | |
| *B33Y 10/00* | (2015.01) | |
| *B33Y 70/10* | (2020.01) | |
| *B33Y 80/00* | (2015.01) | |
| *C22C 38/04* | (2006.01) | |
| *C22C 38/34* | (2006.01) | |
| *C22C 38/54* | (2006.01) | |
| *B22F 3/105* | (2006.01) | |
| *C21D 6/00* | (2006.01) | |
| *C21D 1/26* | (2006.01) | |
| *C21D 1/32* | (2006.01) | |
| *C22C 38/02* | (2006.01) | |
| *C21D 6/02* | (2006.01) | |
| *C22C 33/02* | (2006.01) | |
| *B22F 3/00* | (2006.01) | |
| *B33Y 70/00* | (2020.01) | |
| *B23K 101/20* | (2006.01) | |
| *B23K 103/04* | (2006.01) | |
| *B23K 103/10* | (2006.01) | |
| *B23K 101/04* | (2006.01) | |

(Continued)

(52) U.S. Cl.
CPC ............. *C22C 38/58* (2013.01); *B22F 3/008* (2013.01); *B22F 3/1055* (2013.01); *B23K 15/0086* (2013.01); *B23K 15/0093* (2013.01); *B23K 26/342* (2015.10); *C21D 1/26* (2013.01); *C21D 1/32* (2013.01); *C21D 6/004* (2013.01); *C21D 6/02* (2013.01); *C22C 33/0257* (2013.01); *C22C 38/02* (2013.01); *C22C 38/04* (2013.01); *C22C 38/34* (2013.01); *C22C 38/54* (2013.01); *B22F 7/06* (2013.01); *B22F 2003/248* (2013.01); *B22F 2007/042* (2013.01); *B22F 2998/10* (2013.01); *B22F 2999/00* (2013.01); *B23K 2101/045* (2018.08); *B23K 2101/06* (2018.08); *B23K 2101/10* (2018.08); *B23K 2101/12* (2018.08); *B23K 2101/20* (2018.08); *B23K 2103/04* (2018.08); *B23K 2103/05* (2018.08); *B23K 2103/10* (2018.08); *B33Y 10/00* (2014.12); *B33Y 70/00* (2014.12); *B33Y 80/00* (2014.12); *C21D 2201/03* (2013.01); *C21D 2211/001* (2013.01); *C21D 2211/004* (2013.01); *C21D 2251/02* (2013.01); *C21D 2251/04* (2013.01); *C22C 33/0285* (2013.01); *C22C 33/0292* (2013.01)

(58) Field of Classification Search
CPC ............ B23K 15/0086; B23K 15/0093; B23K 2101/045; B23K 2101/06; B23K 2101/10; B23K 2101/12; B23K 2101/20; B23K 2103/04; B23K 2103/05; B23K 2103/10; B23K 26/342; B33Y 10/00; B33Y 70/00; B33Y 80/00; C21D 1/26; C21D 1/32; C21D 2201/03; C21D 2211/001; C21D 2211/004; C21D 2251/02; C21D 2251/04; C21D 6/004; C21D 6/02; C22C 33/0257; C22C 33/0285; C22C 33/0292; C22C 38/02; C22C 38/04; C22C 38/34; C22C 38/54; C22C 38/58

See application file for complete search history.

(56) References Cited

U.S. PATENT DOCUMENTS 4,297,135 A   10/1981   Glessen et al.
4,405,368 A    9/1983   Ray et al.
(Continued)

FOREIGN PATENT DOCUMENTS

CN   102597297 A   7/2012
CN   103602981     2/2014
(Continued)

OTHER PUBLICATIONS

International Search Report dated Feb. 6, 2017 issued in related International Patent Application No. PCT/US2016/060185.
(Continued)

*Primary Examiner* — Ngoc-Yen Nguyen
(74) *Attorney, Agent, or Firm* — Grossman, Tucker, Perreault & Pfleger, PLLC

(57) ABSTRACT

The present disclosure is directed at alloys and method for layer-by-layer deposition of metallic alloys on a substrate to produce a metallic part. Applications for the metallic parts include pumps, pump parts, valves, molds, bearings, cutting tools, filters or screens.

15 Claims, 14 Drawing Sheets

(51) Int. Cl.
*B23K 101/06* (2006.01)
*B23K 101/10* (2006.01)
*B23K 101/12* (2006.01)
*B22F 3/24* (2006.01)
*B22F 7/04* (2006.01)
*B22F 7/06* (2006.01)

(56) References Cited

U.S. PATENT DOCUMENTS

| 2010/0080727 | A1 | 4/2010 | Powell |
| 2010/0279147 | A1* | 11/2010 | Kusinski ............... C23C 4/08 |
| | | | 428/678 |
| 2011/0300016 | A1 | 12/2011 | Heath |
| 2014/0190594 | A1 | 7/2014 | Branagan et al. |
| 2015/0147591 | A1 | 5/2015 | Cheney et al. |

FOREIGN PATENT DOCUMENTS

| JP | S58-22359 | 2/1983 |
| WO | 8404760 | 12/1984 |

OTHER PUBLICATIONS

European Search Report dated Apr. 3, 2019 issued in related International Patent Application No. PCT/US2016/060185.

Zhao G-M et al: "Effect of La"20"3 on resistance to high-temperature oxidation of laser clad ferrite-based alloy coatings", Surface and Coatings Techno, Elsevier BV, Amsterdam, NL, vol. 190, No. 2-3, Jan. 21, 2005 (Jan. 21, 2005), pp. 249-254.

Z. Mei et al: "Transmission electron microscopy characterization of laser-clad iron-based alloy on Al—Si alloy", Materials Characterization, vol. 56, No. 3, Apr. 1, 2006 (Apr. 1, 2006), pp. 185-191.

Vilar R et al: "Laser-assisted combinatorial methods for rapid design of wear resistant iron alloys", Surface and Coatings Technology, Elsevier BV, Amsterdam, NL, vol. 203, No. 19, Jun. 25, 2009 (Jun. 25, 2009), pp. 2878-2885.

Han-Guang F et al: "Structural variations in heat treated B-bearing stainless steel", Materials and Design, London, GB, vol. 30, No. 3, Mar. 1, 2009 (Mar. 1, 2009), pp. 885-891.

Written Opinion dated Jun. 28, 2019 issued in related Singapore Patent Application No. 11201803644R.

Translation of Office Action dated Jul. 23, 2019 issued in related Chinese Patent Application No. 201680071356.1.

Translation of Office Action dated Mar. 6, 2020 issued in related Chinese Patent Application No. 201680071356.1.

Office Action dated Mar. 19, 2020 issued in related European Patent Application No. 16 862 914.5.

Translation of Office Action dated Jun. 30, 2020 issued in related Chinese Patent Application No. 201680071356.1.

Translation of Office Action dated Jul. 13, 2020 issued in related Japanese Patent Application No. 2018-522510.

Office Action dated Sep. 24, 2020 issued in related Indian Patent Application No. 201817020648.

\* cited by examiner

LAYERED CONSTRUCTION OF IN-SITU METAL MATRIX COMPOSITES

CROSS REFERENCE TO RELATED APPLICATIONS

This application claims the benefit of U.S. Provisional Application Ser. No. 62/249,642 filed Nov. 2, 2015.

FIELD OF THE INVENTION

The present invention relates to alloys and metal matrix composites and methods for the preparation of free-standing metal matrix composites in a layerwise manner.

BACKGROUND

Ferrous metals are used as coatings in many applications such as drill pipe hardbanding, mining truck bed liners, and boiler tubes, where the coatings provide wear and abrasion resistance to relatively less wear resistant components. These wear resistant coatings are either metal or metal matrix composites, and they can be applied to substrates via various techniques such as HVOF or twin-wire arc thermal spray, and PTAW or GMAW weld overlay.

Wear resistant ferrous metal coatings are generally characterized by a relatively low cost and a relatively high surface hardness which enables the wear resistance of the materials and protects the underlying substrate. The materials used as wear resistant coatings were designed to adhere to a substrate and provide the desired surface performance, and as such are largely dependent on the substrate for non-surface properties such as strength and toughness. Examples of ferrous metal coatings used for wear resistance include chrome carbides, complex carbides, titanium carbides, vanadium carbides, and tool steels. When the coatings are increased in thickness beyond a critical thickness they typically crack due to the low toughness of the coating material and the decreasing effect the substrate has on the toughness of the substrate/coating material system. This cracking severely limits the ability to use the coating materials in layer-by-layer construction of freestanding parts.

Layerwise construction can be understood herein as a process where layers of a material are built up, or laid down, layer by layer to fabricate not a coating, but a freestanding component. Layerwise construction is commonly referred to as additive manufacturing or 3D printing. Examples of layerwise construction include powder bed fusion with a laser (PBF-L) or electron-beam (PBF-E) energy source, directed energy deposition (DED), binder jetting (BJ), sheet lamination, material extrusion, material jetting, and vat photopolymerization. The primary layerwise construction processes used with metal include PBF-L, PBF-E, DED, and BJ.

Layerwise construction processes have excellent capability to construct freestanding, whole components rather than coatings from a variety of ductile metals including stainless steel alloys, aluminum alloys, titanium alloys, nickel-based alloys, and cobalt chrome alloys. In liquid-phase layerwise construction processes for metals such as PBF-L, PBF-E, and DED, the construction material transitions from a solid phase to a liquid phase (melting), then back to a solid phase (solidification). The energy source used for melting can be focused to a relatively small area of the material surface to be melted and as such can control the volume of material being melted to a relatively small volume. The small molten volume, being in contact with a large solid volume, has the capability to solidify in a relatively rapid manner. This rapid solidification is responsible for grain size refinement, supersaturation, and a match or an increase in mechanical properties when compared to wrought metal properties.

While the mechanical properties of components constructed in this manner are generally equal to or higher than wrought processes, none of the aforementioned materials possess the combination of relatively high wear resistance and toughness, and those with the highest wear resistance generally require aggressive heat treating processes such as quench and temper, or solutionizing and aging, to yield a relatively high wear resistance. Such aggressive heat treating typically results in increased yield loss and part distortion, which is undesirable.

High wear resistance and toughness in components is desired for numerous applications to increase the durability (longevity) of the components in service such as pumps, valves, molds bearings, filters, and screens. The present invention now identifies alloys and corresponding manufacturing procedures that provide for a layered metallic material, prepared via a layer-by-layer build-up, that provides a unique combination of relatively high wear resistance and toughness. In addition, the properties herein do not require quenching and/or tempering, but rather a heating and cooling rate independent, low-distortion, heat treatment.

SUMMARY

Layer-by-layer construction is applied to alloys to produce a free-standing material with relatively high wear resistance and toughness. The alloys comprise at least 50.0 weight % Fe along with B, Cr, Si and Ni, and optionally, C and Mn. Parts constructed in a layer-by-layer manner with the alloys have an initial level of boride phases. The layer-by-layer construction allows for the formation of metallic components that may be utilized in applications such as pumps, pump parts, valves, molds, bearings, cutting tools, filters or screens.

The method may more specifically comprise the layer-by-layer construction of a metallic part comprising supplying an alloy in particle form comprising the following elements: at least 50.0 wt. % Fe, in combination with B, Cr, Si and Ni, and optionally C and/or Mn and supplying a substrate. One may then apply one or more layers of the alloy onto the substrate by melting the alloy into a molten state and cooling and forming a solidified layer wherein each of the solid layers has a thickness as formed of 5.0 to 200.0 microns. This is then followed by heat treating the alloy and optionally removing the substrate to form a free-standing metallic part wherein the one or more solid layers indicates an abrasion resistance as measure by ASTM G65-04(2010) Procedure A of less than or equal to 175 mm$^3$. In addition, the solidified layer after cooling includes the identified elements defining a primary dendritic austenite phase and an initial level of relatively small interdendritic lamellar boride phases with lamella width of less than 0.1 micron, and upon heating, the interdendritic lamellar boride phases consolidate and grow including by diffusion of elements from the primary phase into relatively small spheroidized (sphere-like shape) boride phases which range in diameter from about 0.2 micron to 5 microns.

The present disclosure also relates to an alloy in layer form comprising the following elements: Fe at a level of 50.0 to 76.0 wt. %, B at 0.5 to 3.0 wt. %, Cr at 15.0 to 22.0 wt. %, Si at 2.0 to 5.0 wt. %, and Ni at 5.0 to 15.0 wt. %, optionally containing Mn at 0.3 to 3.0 wt % and C at a level up to 0.5 wt. %. The alloy initially includes a primary dendritic austenite phase and relatively small interdendritic lamellar boride phases with lamella width of less than 0.1 micron. The alloy then further includes secondary spheroidized boride phases, which range in diameter from about 0.2 micron to 5 microns, grown from the relatively small boride phases initially present in the layer where the alloy then indicates an abrasion resistance as measured by ASTM G65-04(2010) Procedure A of less than or equal to 175 mm$^3$.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
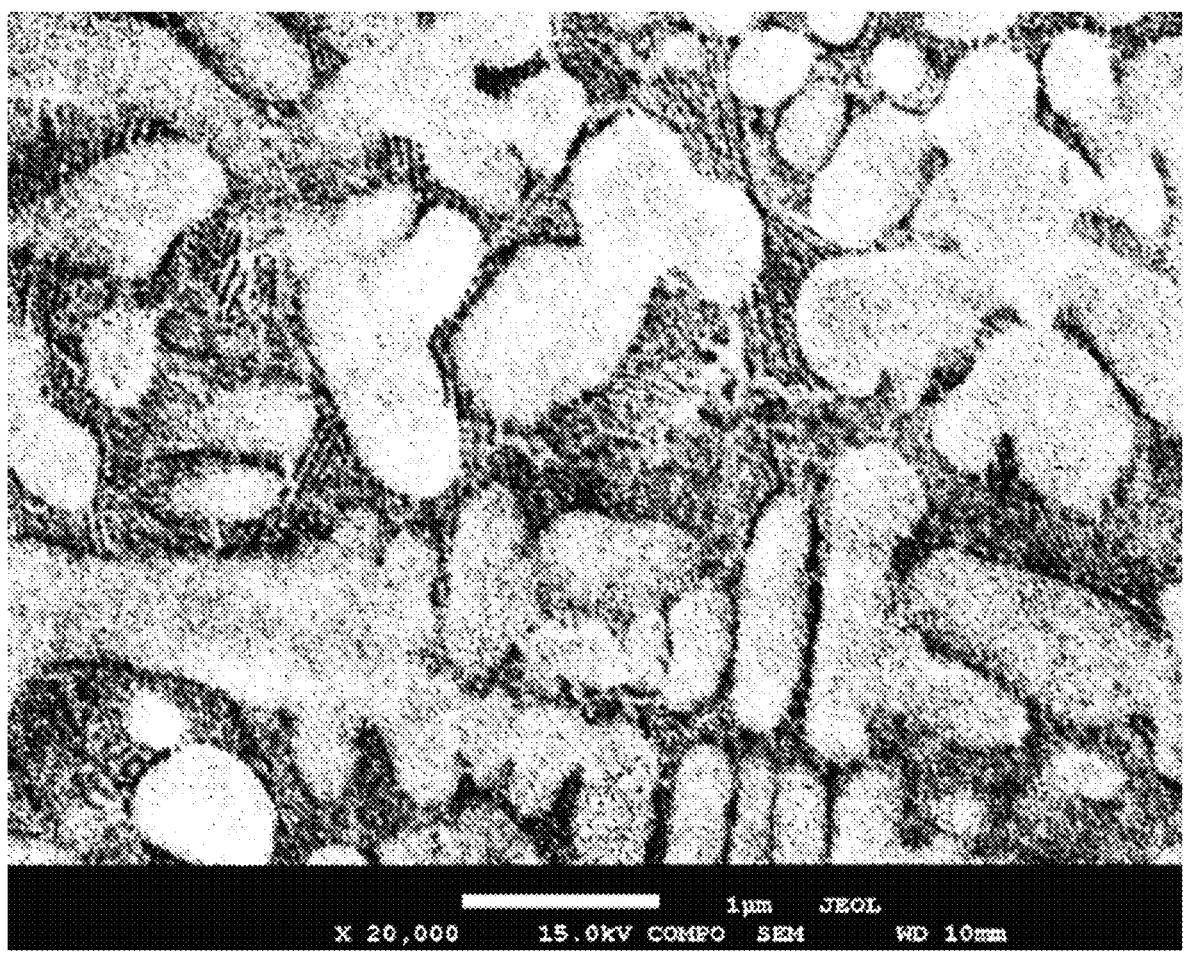
FIG. 1 is a SEM cross-sectional micrograph of a ferrous alloy A5 powder particle.

The present invention relates to a method of constructing free-standing and relatively wear-resistant and ductile and/or tough iron-based metallic materials, to provide a built metallic structure, via a layer-by-layer build-up of successive metal layers on an initial substrate. Layer-by-layer build up is reference to the general procedure of melting metallic alloys and cooling and solidifying to form a layer of material, which becomes an underlying solid layer for subsequent application of an additional molten alloy layer, again followed by cooling. The substrate may or may not be included in the built structure that is formed by the layer-by-layer procedure. Reference to a free-standing metallic material is therefore to be understood herein as that situation where the layer-by-layer build up, on a substrate, is employed to form a given built structure, which structure may then serve as a metallic part component in a variety of applications.

Suitable substrates for initiating the layer-by-layer build up may include austenitic, ferritic, and martentisic steels and may have thickness in the range of 3 mm-100 mm. As noted, the substrates typically are not included as part of the final structure and after building the structure the substrate and structure may be separated via a variety of techniques including electric-discharge machining (EDM) and mechanical sawing.

The layer-by-layer procedure herein contemplates a build-up of individual layers each having a thickness in the range of 3.0 microns to 200.0 microns. The layer-by-layer procedure may then provide for build-up with an overall thickness in the range of 3 microns to greater than 50.0 mm, and more typically greater than 250.0 mm. Accordingly, suitable range of thickness for the built-up layers is 3.0 microns and higher. More commonly, however, the thickness ranges are from 3.0 microns to 250.0 mm.

In the layerwise construction used herein, preferably, an energy source, typically a laser or electron beam, is scanned over a material surface causing at least partial melting of a layer of material local to the area irradiated by the energy source. If desired, the energy source can be tuned to also melt a certain depth of the underlying material. For example, the energy source can be adjusted to melt at a depth in the range up to 250 microns. The molten material metallurgically bonds with the underlying material and rapidly solidifies as the energy source moves away. Additional material is added to the solidified material and then irradiated with the energy source to cause melting and solidification. As this process is repeated the thickness of the part being constructed increases.

Preferably, the alloys for layer-by-layer construction herein are supplied in particle form, meaning that particles are present having a diameter in the range of 1.0 microns to 200.0 microns, more preferably from 15.0 microns to 70.0 microns, and most preferably from 20.0 microns to 45.0 microns.

The alloys herein are preferably produced from alloys A5 and A6. Alloy A5 has the following composition: Fe at 55.5 to 71.5 wt. %; B at 0.5 to 3.0 wt. %; Cr at 15.0 to 20.0 wt. %; Si at 2.0 to 5.0 wt. %; C at 0.0 to 0.5 wt. %; Ni at 11.0 to 15.0 wt. %. Alloy A6 has the following composition: Fe at 55.5 to 75.2 wt. %; B at 0.5 to 3.0 wt. %; Cr at 17.0 to 22.0 wt. %; Mn at 0.3 to 3.0 wt. %; Si at 2.0 to 5.0 wt. %; C at 0.0 to 0.5 wt. %; and Ni at 5.0 to 10.0 wt. %. Alloy A7 has the following composition: Fe at 54.5 to 69.5 wt. %; B at 0.5 to 3.0 wt. %; Cr at 16.5 to 20.5 wt. %; Mn at 1.0 to 2.5 wt. %; Si at 2.0 to 5.0 wt. %; C at 0.0 to 0.5 wt. %; and Ni at 10.5 to 14.0 wt. %.

It may therefore be appreciated that the alloys herein contains at least 50.0 wt. % Fe, in combination with B, Cr, Si and Ni, where C and Mn are optional. Preferably, Fe is present at a level of 50.0 to 76.0 wt. %, B is present at 0.5 to 3.0 wt. %, Cr is present 15.0 to 22.0 wt. %, Si is present at 2.0 to 5.0 wt. % and Ni is present at 5.0 to 15.0 wt. %. Both C and Mn are optional, where the C may be present at levels of 0.0 to 0.5 wt. % and the Mn if present is present at levels of 0.3 to 3.0 wt. %.

The iron-based alloys herein are such that when formed into the liquid phase at elevated temperatures and allowed to cool and solidify rapidly, the structure contains supersaturated solid solution austenitic dendrites that preferably contains an initial level of distributed secondary boride phases in the interdendritic regions that are formed in-situ (i.e. during the cooling process). The cooling rates may be in the range of $10^3$ to $10^8$ K/sec. More preferably, the cooling rates may be in the range of $10^4$ to $10^7$ K/sec, and even more preferably, in the range of $10^4$ to $10^5$ K/sec.

Figure 2:
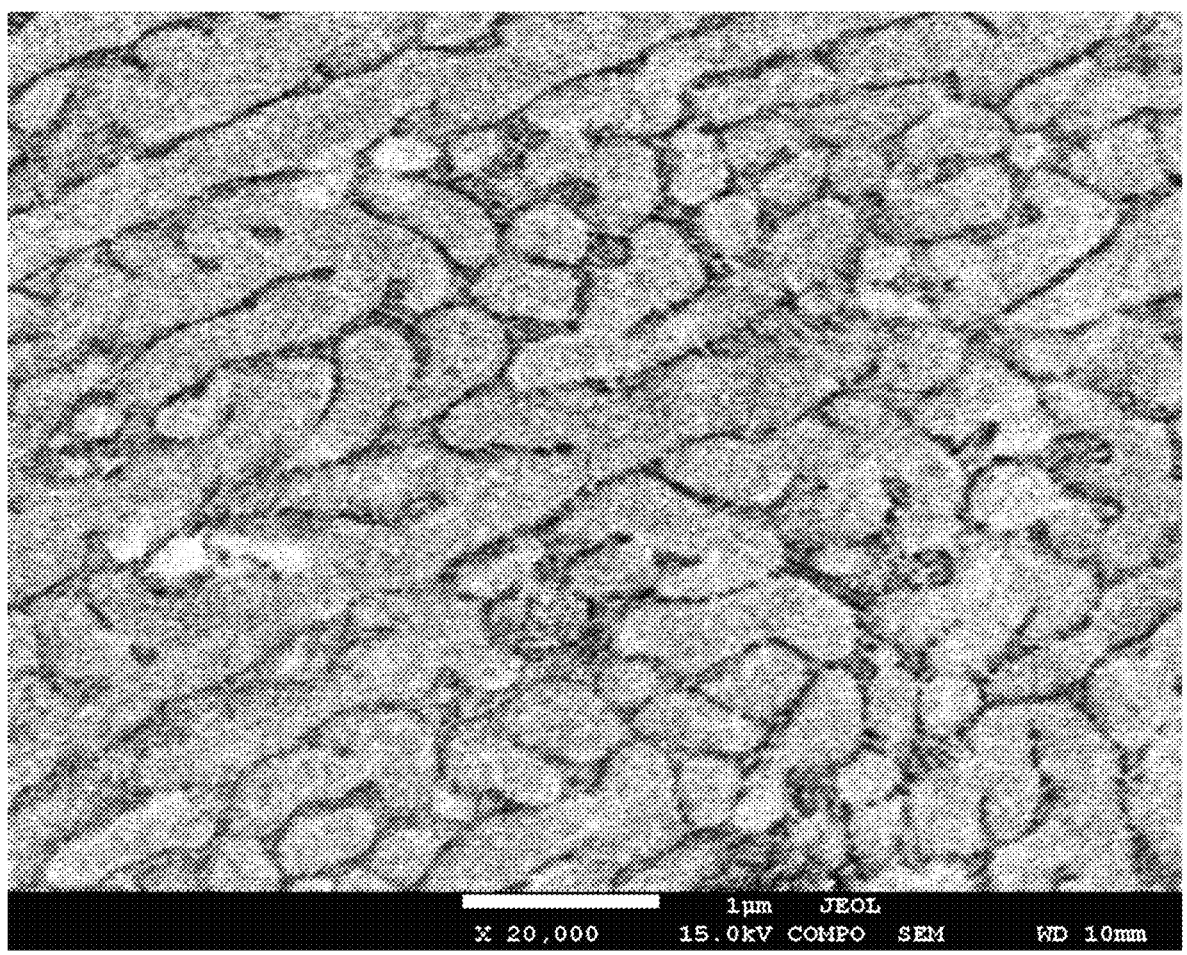
FIG. 2 is a SEM cross-sectional micrograph of a ferrous alloy A6 powder particle.

FIGS. 1 and 2 show SEM images of the powder microstructures in example ferrous alloys A5 and A6, respectively. The nanometer-scale interdendritic lamellar dark phase is an initial secondary $M_2B$ boride phase, surrounded by the primary steel austenitic dendrite matrix phase, where M represents a mixture of Fe and Cr.

It is worth noting that the above ferrous alloys initially have a relatively low wear resistance, where alloys A5, A6, and A7 measured 466 mm$^3$, 391 mm$^3$, and 412 mm$^3$, respectively, in volume loss when tested in the ASTM G65-04(2010) Procedure A abrasion resistance test. As discussed herein, upon triggering of growth of secondary boride phases in the layer-by-layer procedure one now unexpectedly provides remarkably improved wear resistance properties.

Figure 3:
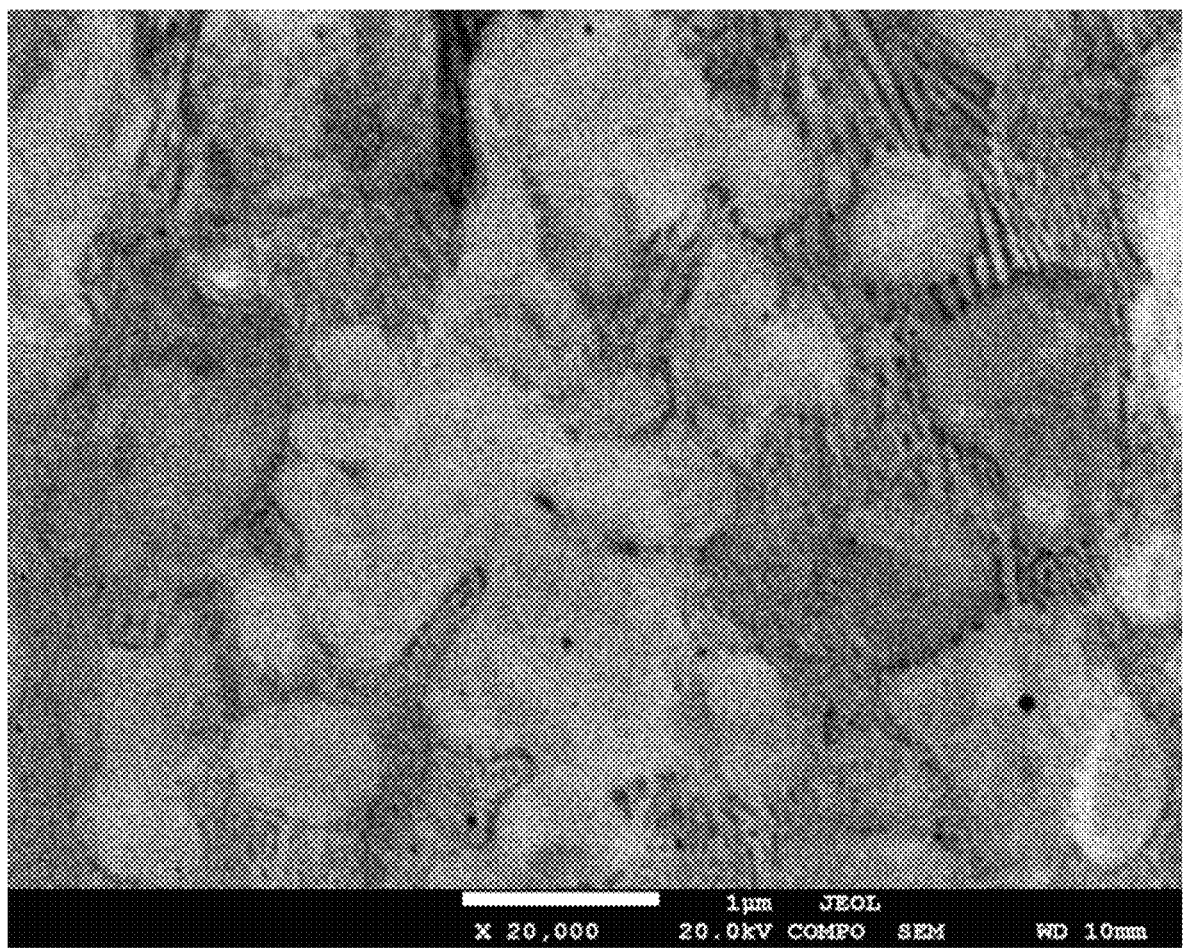
FIG. 3 is a SEM micrograph of ferrous alloy A5 processed via PBF-L in an as-built condition.
Figure 4:
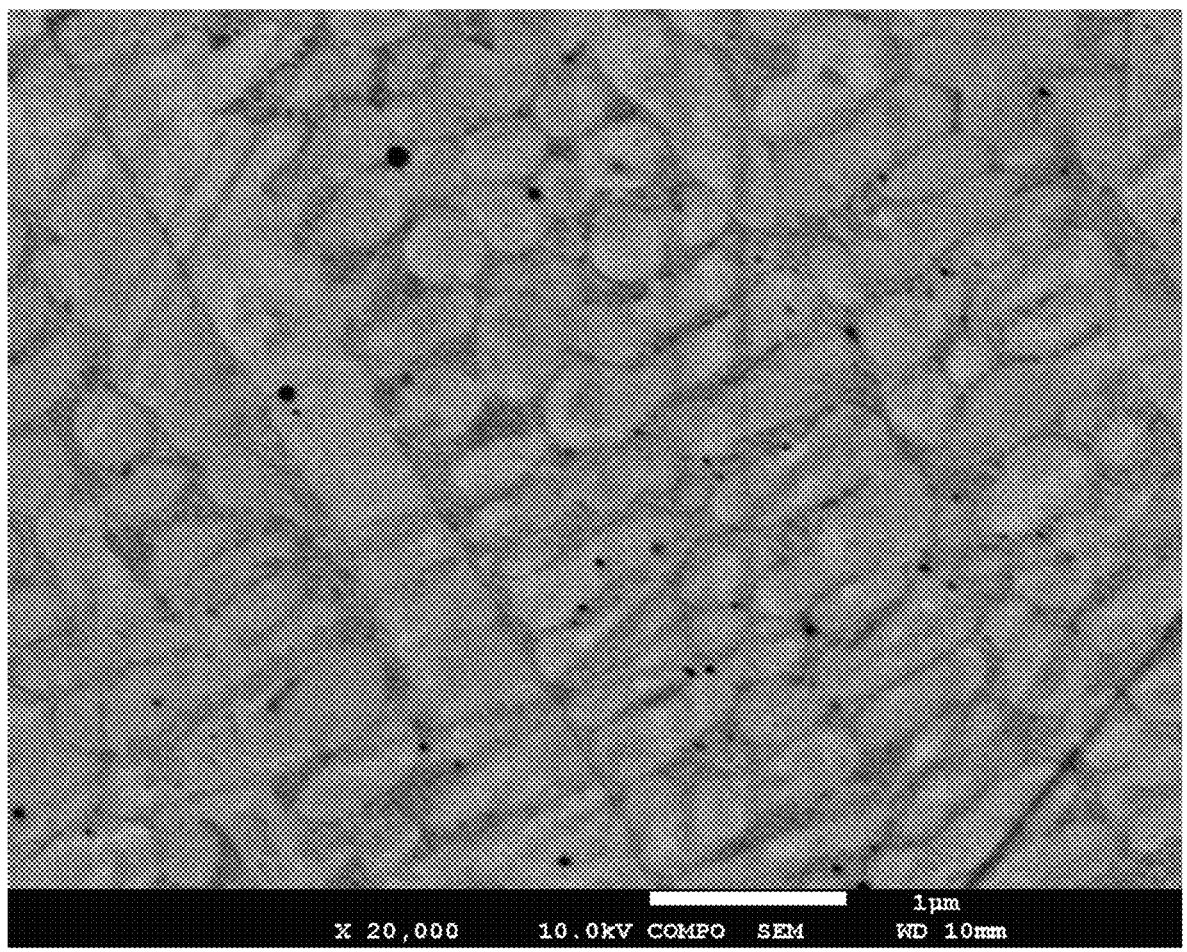
FIG. 4 is a SEM micrograph of ferrous alloy A6 processed via PBF-L in an as-built condition.

FIGS. 3 and 4 show representative SEM micrographs of ferrous alloys A5 and A6, respectively, after processing via PBF-L. The dark secondary interdendritic $M_2B$ boride phases are approximately the same size and morphology as are seen in the rapidly solidified powder particles of the same alloy. The phase sizes may be determined by optical microscopy and/or scanning electron microscopy (SEM) with energy dispersive spectroscopy (EDS).

Figure 5:
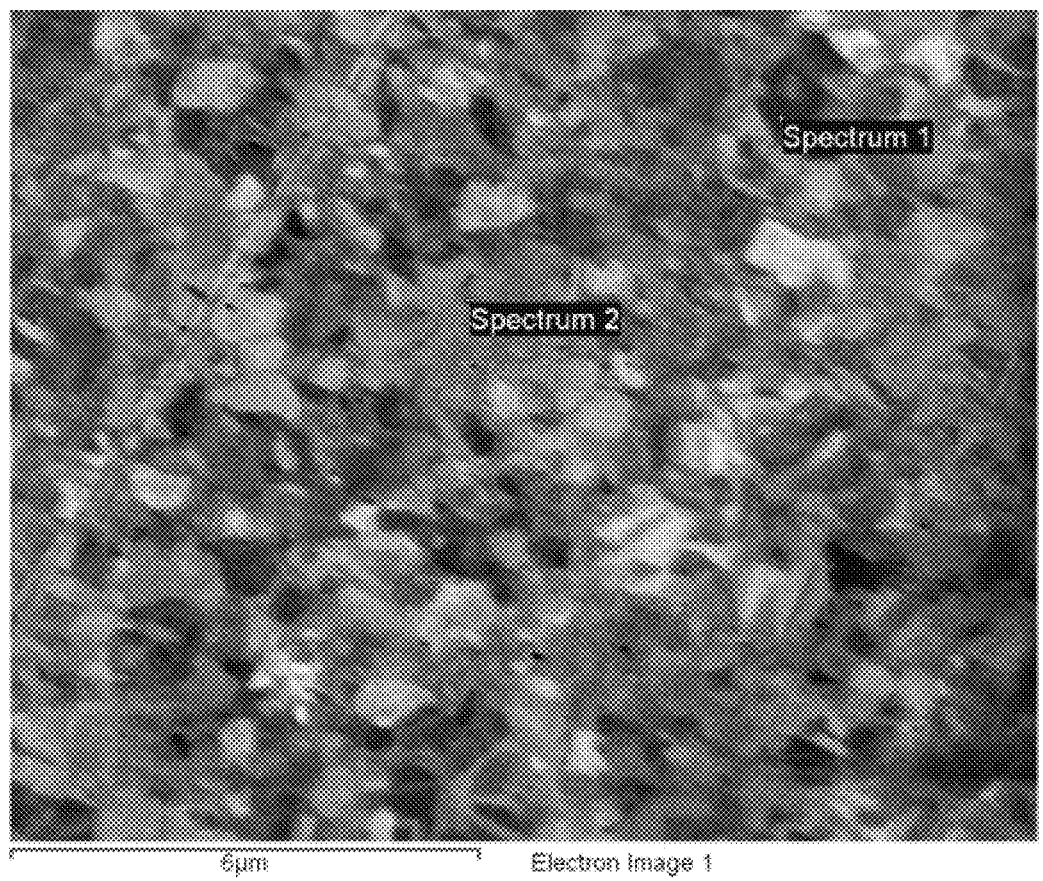
FIG. 5 consists of a SEM image and EDS spectra of alloy A5 processed via PBF-L in an as-built condition.
Figure 5:
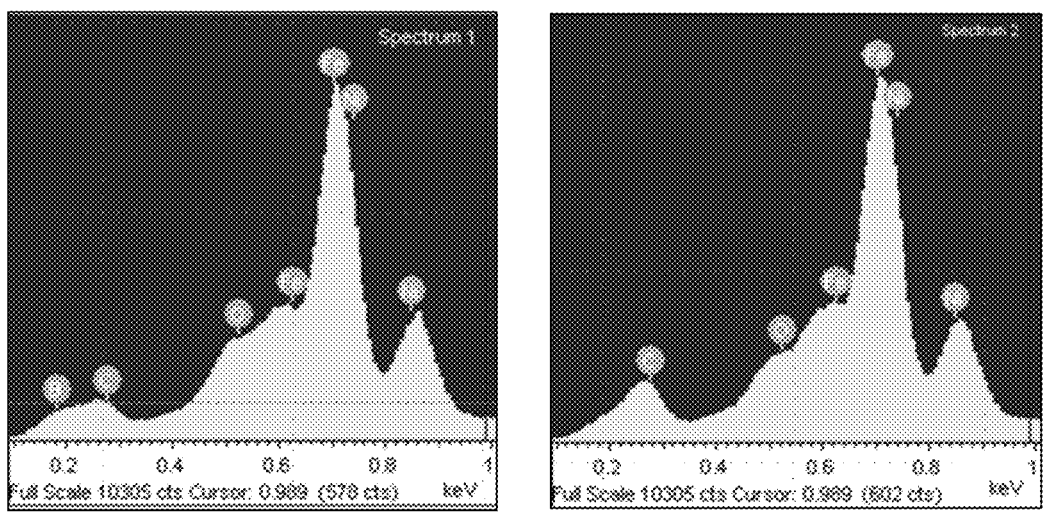

FIG. 5 shows a SEM image and EDS spectra of PBF-L processed alloy A5 taken from two different locations defined on the SEM image as Spectrum 1 (dark phase) and Spectrum 2 (light phase). The EDS spectra at Spectrum 1 shows a knee at the boron peak indicating the presence of boron in the dark phase. The boron "knee" is not present in the EDS spectra for Spectrum 2 indicating there is less boron in the light phase.

Figure 6:
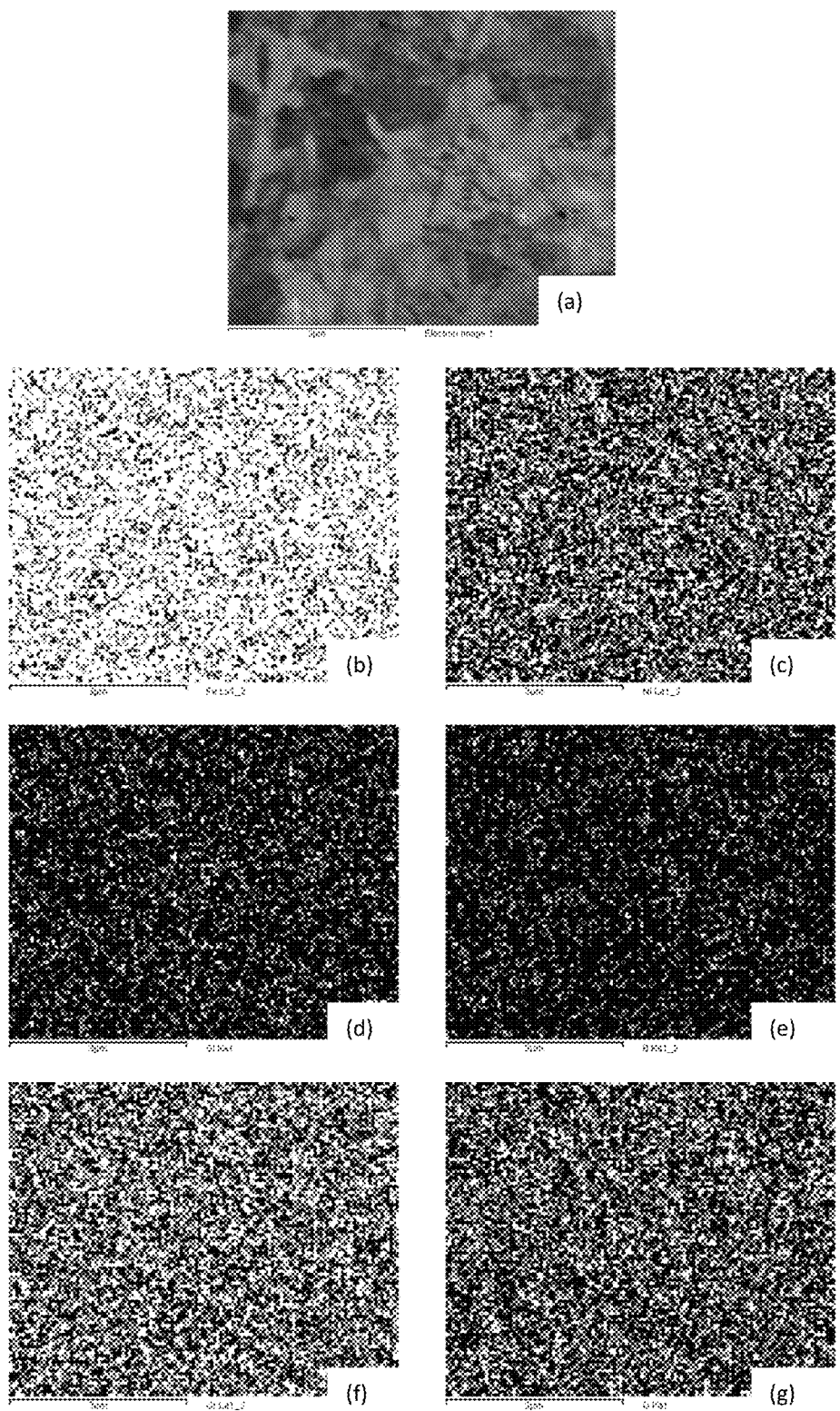
FIG. 6 consists of a SEM image and EDS elemental map of alloy A5 produced via PBF-L in an as-built condition that shows the primary elements Fe, Ni, Si, B, Cr, O, and Mn contained within the various phases.
Figure 7:
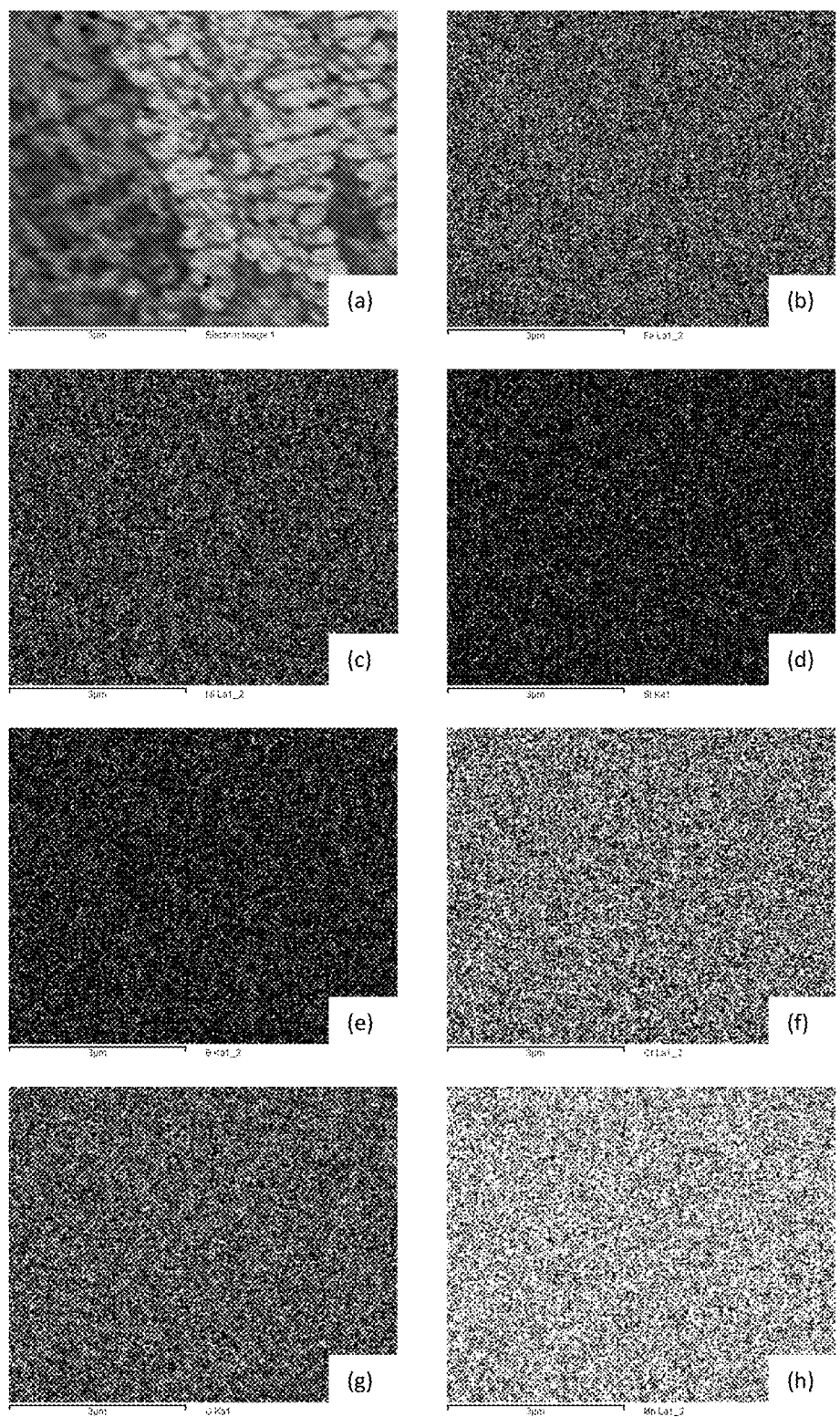
FIG. 7 consists of a SEM image and EDS elemental map of alloy A6 produced via PBF-L in an as-built condition that shows the primary elements Fe, Ni, Si, B, Cr, O, and Mn contained within the various hases.

FIGS. 6 and 7 each show a (a) SEM image and elemental map of Alloy A5 and A6, respectively, produced via PBF-L that shows the relative percent of the primary elements (b) iron, (c) nickel, (d) silicon, (e) boron, (f) chromium, (g) oxygen, and (h) Mn, contained within the various phases, where applicable. The elemental map was generated with energy-dispersive spectroscopy in a Jeol JSM-7001F Field Emission SEM and Oxford Inca EDS System with an accelerating voltage of 4 keV, probe current of 14 µA, and livetime of 240 s. The elemental map qualitatively depicts the higher percentage of elements present in each phase by the pixel brightness, where the grayscale value for a given pixel in the digital map corresponds to the number of X-rays which enter the X-ray detector to show the distribution of the elements. The elemental map shows a homogeneous distribution of the elements with low, or no, phase segregation indicating that the elements are supersaturated in the lattice structure of the rapidly solidified layer-by-layer constructed part or are too small to resolve with EDS. A supersaturated structure being a metastable structure where the elemental atoms within the metallic lattice structure exceed the amount that the lattice can hold in normal equilibrium conditions.

The supersaturated structures can be in a high state of stress and therefore have limited toughness. The fine scale (<1 micron) of the distributed relatively hard secondary boride phases produced in the layer by layer construction process are contemplated to enable crack-free construction of components in materials with low, or high, toughness, due to the relatively small area that the phases affect. Large secondary phases produced during construction can to lead to high stress concentration around the secondary phases due to mismatch of material properties over a large area. When the material surrounding the secondary phases has limited toughness, the high stress from the secondary phases can lead to cracking of the components during or after construction. Thus cracking is contemplated to be avoided in the ferrous alloys of the present invention by maintaining relatively small interdendritic secondary boride phases, with rapid cooling, in the layer by layer construction process.

The relatively small secondary boride phases are relatively inefficient at providing relatively high abrasion resistance and toughness in metal matrix composites. The layer-by-layer constructed metal matrix composite structure may preferably be converted to a relatively high abrasion resistant and tough structure through a single-stage high temperature, heating and cooling rate independent, heat treatment. During said heat treatment the relatively hard secondary boride phases consolidate and grow through diffusion. Some of the elements that make up the secondary boride phases diffuse from the supersaturated primary phase, depleting the primary phase of said elements. The depletion of the elements from the primary phase creates a leaner, more ductile and tough primary phase, and thereby, a more ductile and tough composite.

Preferably, with respect to the alloys herein in layer form, the above referenced heat treatment may therefore grow and form one enriched boride phase preferably containing Fe—Cr—B which contributes to the reduced wear resistance of the layered structure and another enriched phase of Fe—Ni—Si which contributes to ductility.

The heat treatment to trigger the above referenced dual phase growth can preferably be in the temperature range of 800-1200° C. for times of 30-1000 min, where the time is the amount of time that the entire part volume is at the defined heat treating temperature. Heat treating can be performed in air, but to reduce the surface oxidation the furnace atmosphere may be a vacuum, inert gas (e.g. argon, helium, and nitrogen), a reducing gas (e.g. hydrogen), or a mixture of inert and reducing gases.

Figure 8:
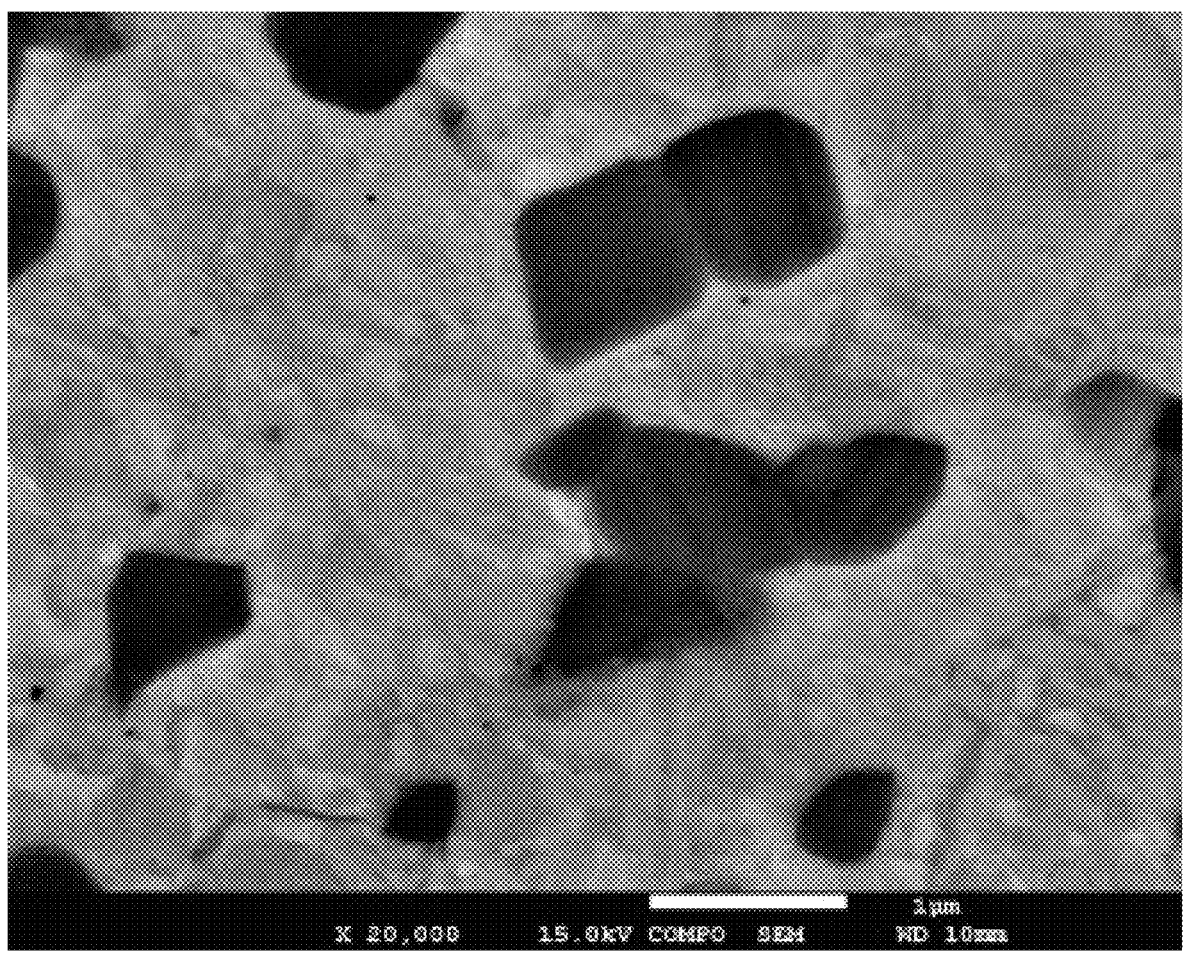
FIG. 8 is a SEM micrograph of ferrous alloy A5 processed via PBF-L then heat treated at 1100° C. for 8 hr.
Figure 9:
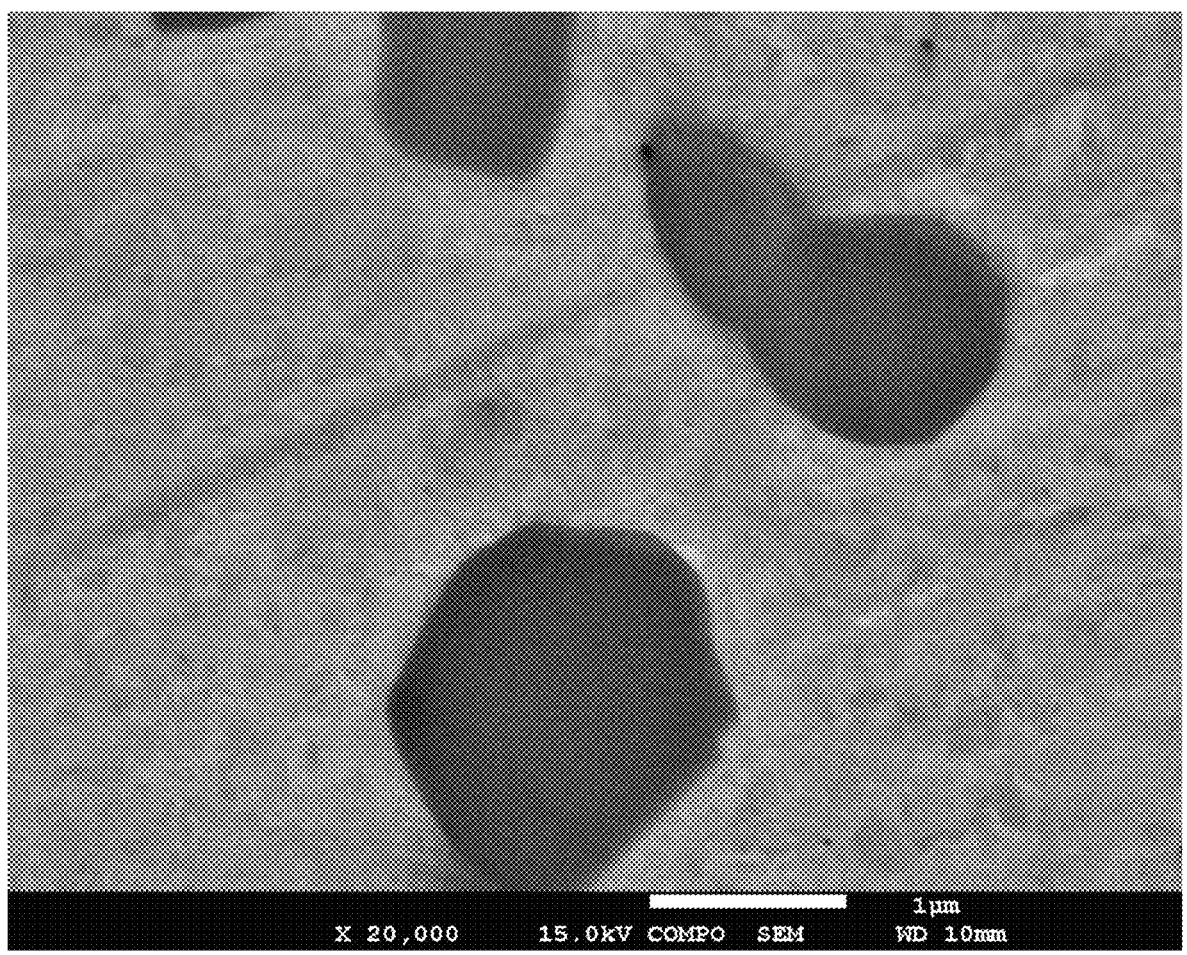
FIG. 9 is a SEM micrograph of ferrous alloy A6 processed via PBF-L then heat treated at 1100° C. for 8 hr.

FIGS. 8 and 9 show SEM images of Alloy A5 and A6, respectively, produced via PBF-L after heat treating for 8 hr at 1100° C. The dark secondary boride phases have clearly transformed to a spheroidized structure and grown from the initial shape and size, as seen in FIGS. 3 and 4.

Figure 10:
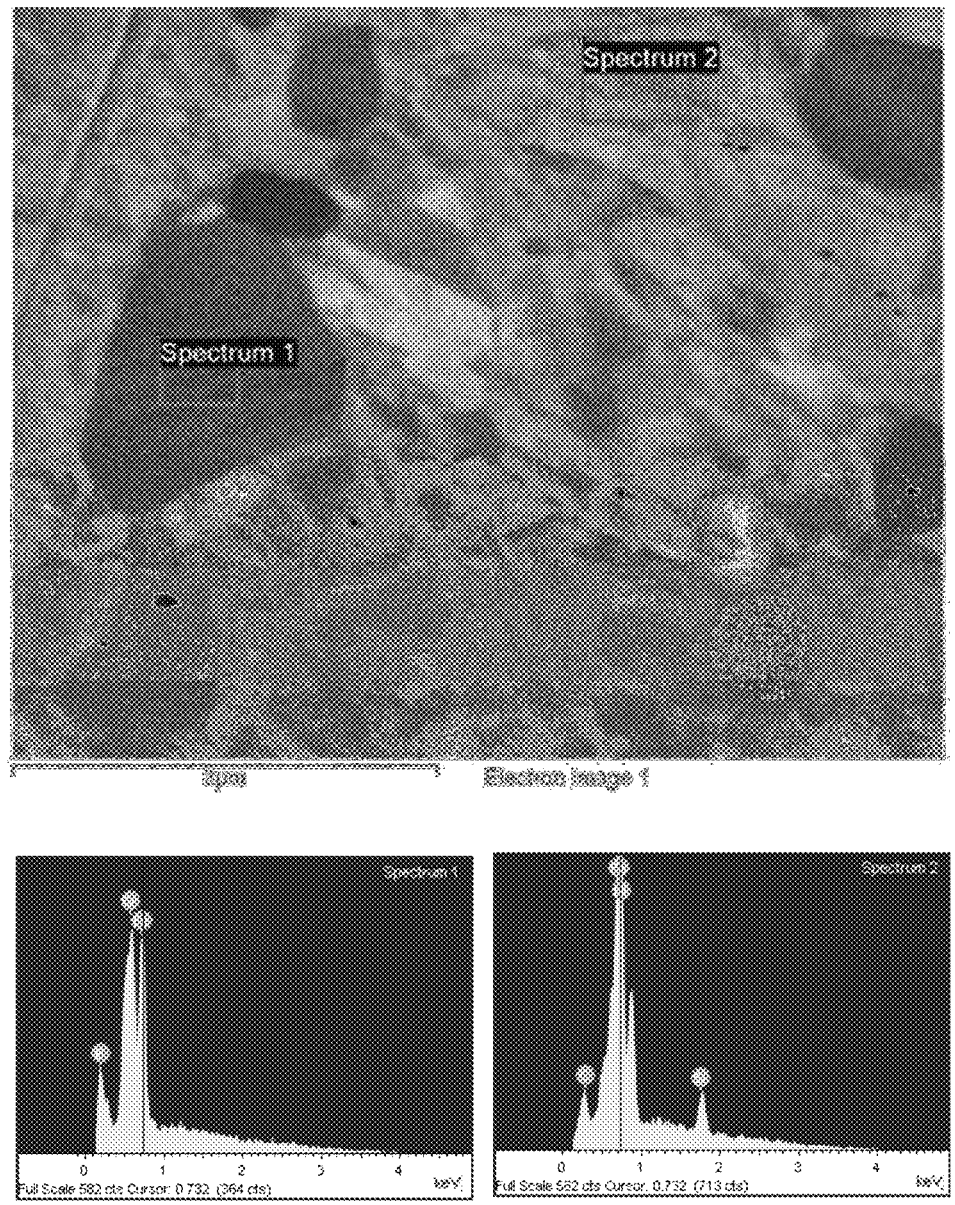
FIG. 10 consists of a SEM image and EDS spectra of alloy A5 processed via PBF-L then heat treated at 1100° C. for 8 hr.
Figure 11:
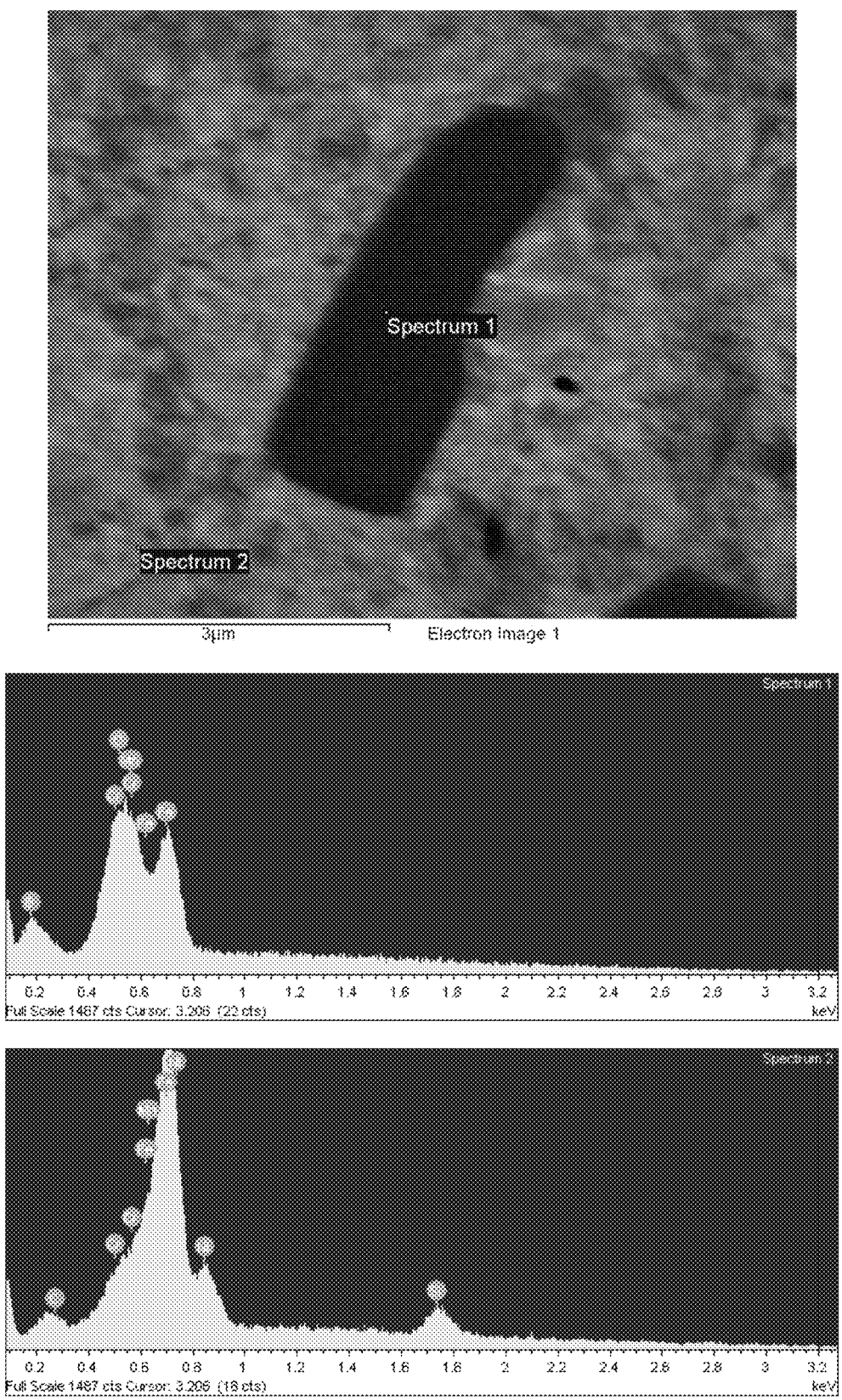
FIG. 11 consists of a SEM image and EDS spectra of alloy A6 processed via PBF-L then heat treated at 1100° C. for 8 hr.

FIGS. 10 and 11 show SEM micrographs and the EDS spectra of PBF-L processed alloys A5 and A6, respectively, after heat treating for 8 hr at 1100° C. The EDS spectra in FIGS. 10 and 11 show very well defined boron peaks in the dark phase of Spectrum 1 and no boron peak in the light phase of Spectrum 2.

Figure 12:
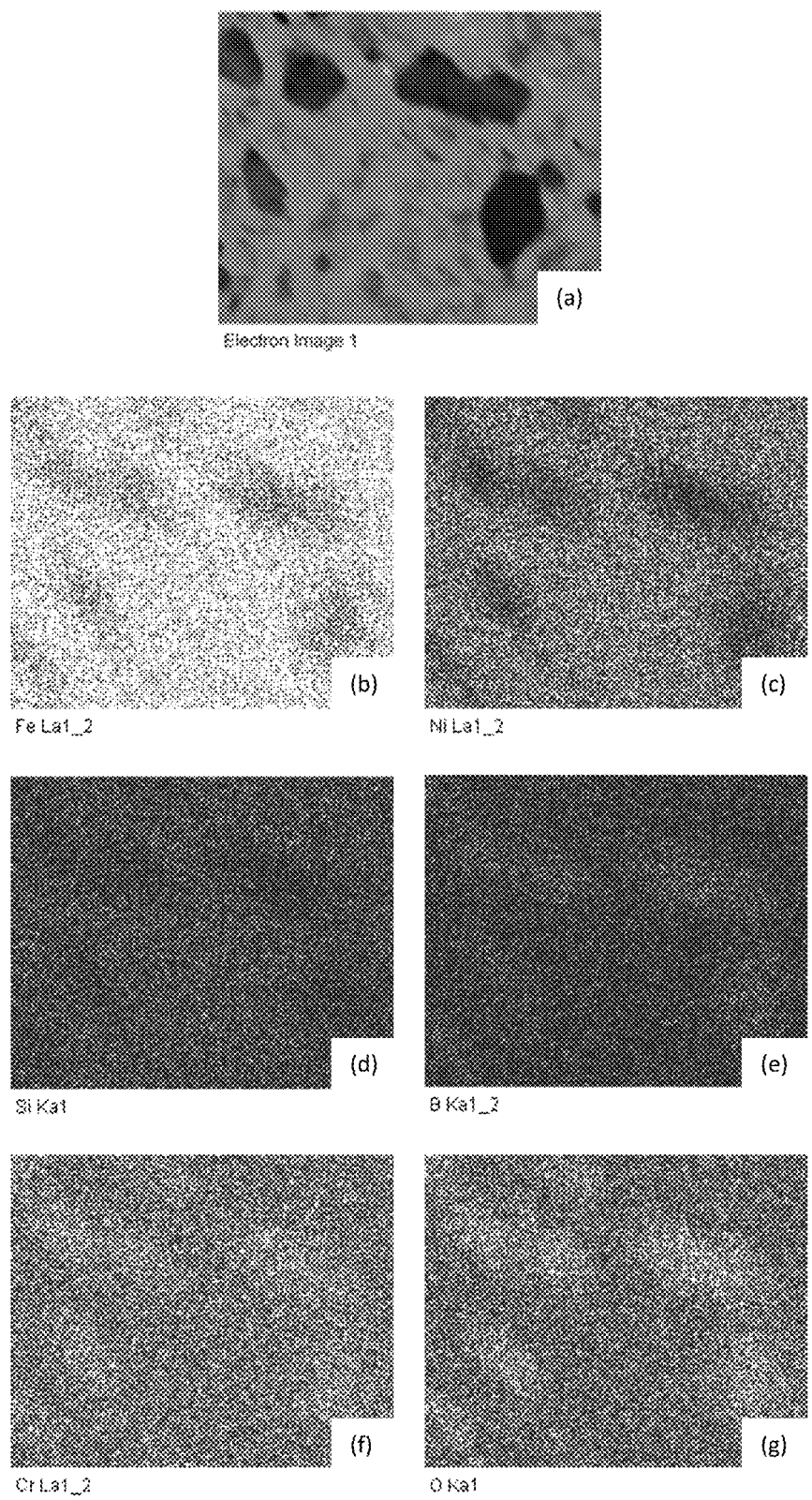
FIG. 12 consists of a SEM image and EDS elemental map of alloy A5 produced via PBF-L then heat treated at 1100° C. for 8 hr that shows the primary elements Fe, Ni, Si, B, Cr, O, and Mn contained within the various phases.
Figure 13:
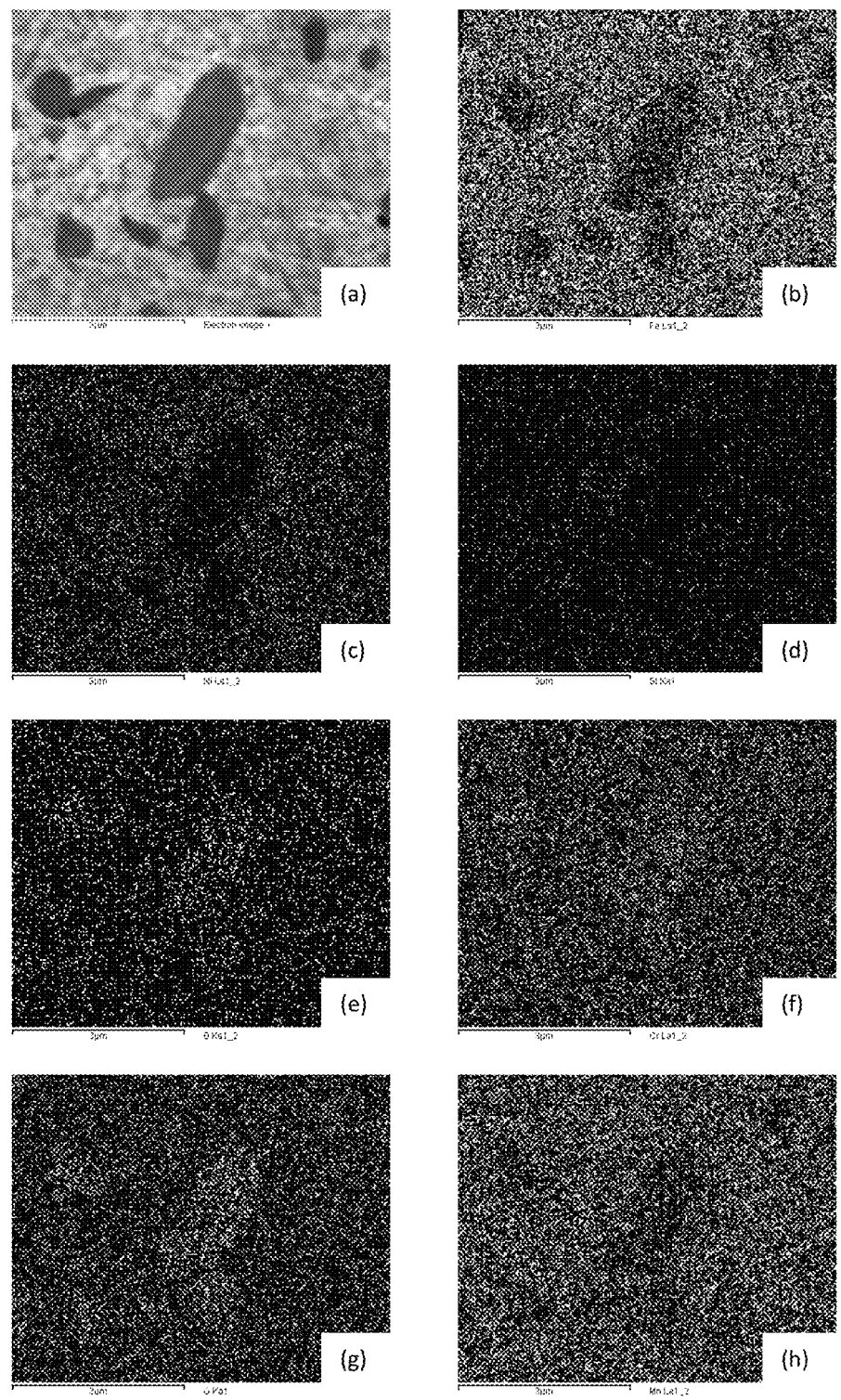
FIG. 13 consists of a SEM image and EDS elemental map of alloy A6 produced via PBF-L then heat treated at 1100° C. for 8 hr that shows the primary elements Fe, Ni, Si, B, Cr, O, and Mn contained within the various phases.

FIGS. 12 and 13 show (a) SEM images and elemental maps of the PBF-L processed alloys A5 and A6, respectively, heat treated at 1100° C. for 8 hr, for the primary elements (b) iron, (c) nickel, (d) silicon, (e) boron, (f) chromium, (g) oxygen, and (h) Mn, contained within the various phases where applicable. The elemental map was generated with energy-dispersive spectroscopy in a Jeol JSM-7001F Field Emission SEM and Oxford Inca EDS System with an accelerating voltage of 4 keV, probe current of 14 µA, and livetime of 240 s. The map shows that the secondary phases are largely enriched in boron, chromium, and oxygen, and the primary matrix phase is enriched in Fe, Ni, Si, and Mn. Comparing the elemental maps of the pre-heat treated alloys in FIG. 6 and FIG. 7 with the maps of the post-heat treated alloys in FIGS. 12 and 13, it is seen that the elements that make up the secondary boride phases are depleted from the matrix phase and have enriched the secondary phases.

Figure 14:
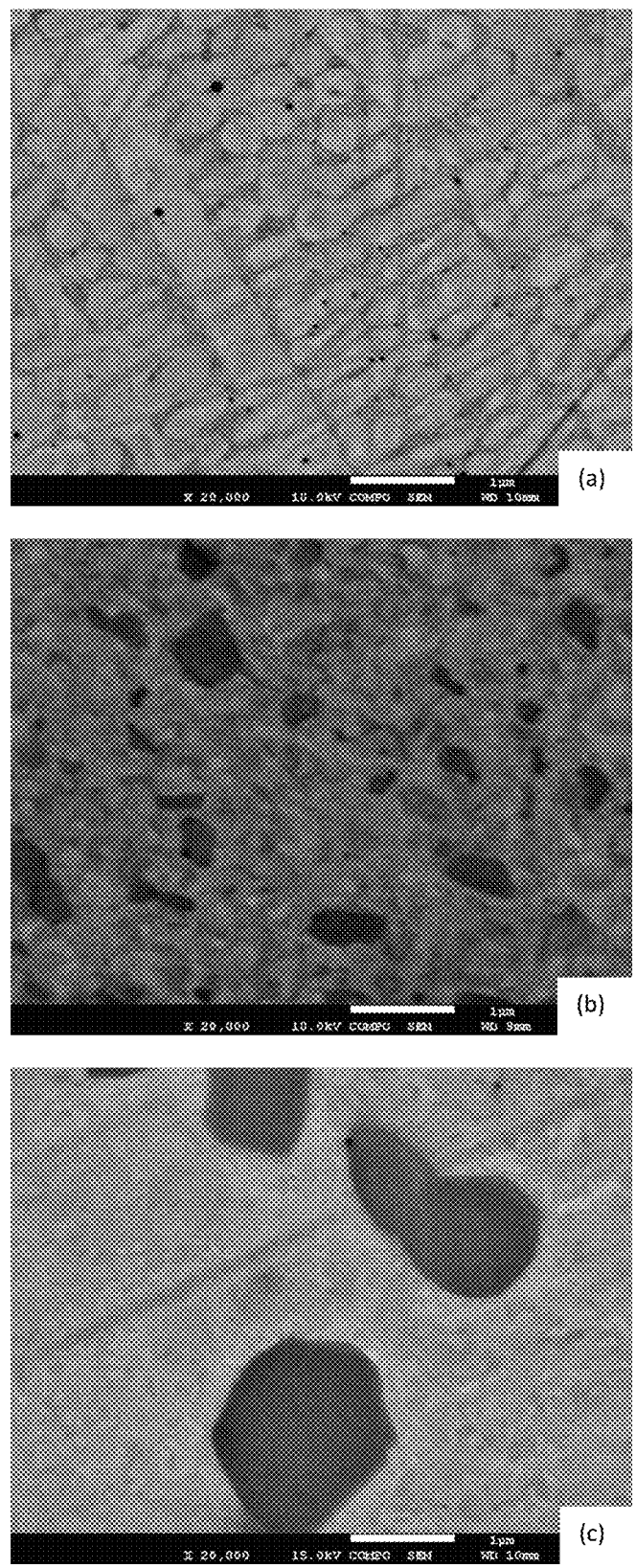
FIG. 14 shows micrographs of alloy A6 processed via PBF-L in the (a) as-built, (b) heat treated at 1100° C. for 3 hr, and (c) heat treated at 1100° C. for 8 hr, conditions.

FIG. 14 shows micrographs of alloy A6 processed via PBF-L in the (a) as-built, (b) heat treated at 1100° C. for 3 hr, and (c) heat treated at 1100° C. for 8 hr, conditions. The boride phases clearly grow with increasing time at the high temperature, indicating that the growth is via diffusion.

Table 1 shows the tensile elongation, impact toughness, and abrasion resistance values for PBF-L processed alloys A5, A6, and A7 in as-built and heat treated (1100° C. for 8 hr) conditions. The tensile elongation and impact toughness are measures of material toughness. The tensile specimens were measured per ASTM E8-13a, the un-notched impact toughness was measured per ASTM E23-12c(2012), and the wear resistance (volume loss) was measured by ASTM G65-04(2010) Procedure A. Heat treating can be seen to increase the tensile elongation, impact toughness, and abrasion resistance. Heat treating the layer-by-layer constructed materials has increased the abrasion resistance by a factor of 2.8 in alloy A5, by a factor of 3.6 in alloy A6, and by a factor of 2.6 in alloy A7, and increased the elongation by a factor of 2.7 in alloy A5, by a factor of 34.5 in alloy A6, and by a factor of 14.7 in alloy A7.

TABLE 1

Effect of heat treating on impact toughness and wear resistance properties of PBF-L layer-by-layer constructed alloys of the present invention

| | As Built | | | Heat Treated | | |
|---|---|---|---|---|---|---|
| Alloy | Tensile Elongation [%] | Impact Toughness [J] | Abrasion Resistance [mm³] | Tensile Elongation [%] | Impact Toughness [J] | Abrasion Resistance [mm³] |
| A5 | 5.2 | 27 | 432 | 14.1 | 119 | 157 |
| A6 | 0.4 | 28 | 410 | 13.8 | 146 | 115 |
| A7 | 1.7 | 22 | 412 | 25.4 | 114 | 160 |

Table 2 show a comparison of the tensile elongation, impact toughness, and abrasion resistance properties of PBF-L heat treated alloys of exemplary examples of alloys of the present invention and conventional alloys used in PBF-L. The tensile elongation was measured per ASTM E8-13a, the impact toughness was measured per ASTM E23-12c(2012) and the abrasion resistance was measured per ASTM G65-04(2010) Procedure A. Unnotched impact toughness specimens were used in the measurements except where indicated otherwise.

TABLE 2

Impact toughness and wear resistance properties of PBF-L layer-by-layer constructed alloys of the present invention and conventional alloys

| Material Type | Grade | Heat Treatment | Abrasion Resistance [mm³] | Tensile Elongation [%] | Impact Toughness [J] |
|---|---|---|---|---|---|
| Stainless Steel | Alloy A5 | 1100° C. for 8 hr | 157 | 14.1 | 119 |
| Stainless Steel | Alloy A6 | 1100° C. for 8 hr | 115 | 13.8 | 146 |
| Stainless Steel | Alloy A7 | 1100° C. for 8 hr | 160 | 25.4 | 114 |
| Stainless Steel | 17-4PH | H900 | 300 | 13.8 | 234 |
| Stainless Steel | 316L | 388° C. for 5 hr | 346 | 28.2 | 99.0* |
| Steel | 18Ni 300 | 491° C. for 6 hr | 410 | 4.2 | 107 |
| Steel | H13 | 580° C. for 1 hr (×2) | 191 | 0.5 | 3* |

*Charpy v-notch specimens

While preferred embodiments of the present disclosure has been described, it should be understood that various changes, adaptations and modifications can be made therein without departing from the spirit of the disclosure and the scope of the appended claims. The scope of the disclosure should, therefore, be determined not with reference to the above description, but instead should be determined with reference to the appended claims along with their full scope of equivalents.

What is claimed is:

1. A method of layer-by-layer construction of a metallic part comprising:
    supplying particles of an alloy, wherein said alloy consists of Fe at a level of 50.0 to 76.0 wt. %; B at 0.5 to 3.0 wt. %; Cr at 15.0 to 22.0 wt. %; Si at 2.0 to 5.0 wt. %; Ni at 5.0 to 15.0 wt. %; optionally C at 0.0 to 0.5%, optionally Mn at 0.3 to 3.0 weight %, and unavoidable impurities;
    supplying a substrate;
    applying said alloy onto said substrate by melting said particles of said alloy into a molten state and cooling to form a solidified layer of said alloy and repeating to form successive solidified layers of said alloy, wherein each of said solidified layers of said alloy has a thickness as formed of 3.0 to 200.0 microns;
    heat treating said solidified layers of said alloy in a vacuum atmosphere, an inert gas atmosphere, a reducing gas atmosphere, or an atmosphere comprising a mixture of inert and reducing gases;
    optionally removing said substrate to form a free-standing metallic part; and
    wherein one or more solidified layers of said alloy has an abrasion resistance as measured by ASTM G65-04 (2010) Procedure A of less than or equal to 175 mm³.

2. The method of claim 1 wherein said cooling is in the range of $10^3$ to $10^8$ K/sec.

3. The method of claim 1 wherein said solidified layer after cooling defines a primary dendritic austenite phase and an initial level of interdendritic lamellar boride phases with lamella width of less than 0.1 microns, and upon heating, said boride phases consolidate and grow by diffusion of said elements from said primary phase into spheroidized boride phases ranging in diameter from about 0.2 micron to 5 microns.

4. The method of claim 1 wherein said heat treatment comprises heating at a temperature in the range of 800 to 1200° C. for a time period of 30-1000 minutes.

5. The method of claim 1 wherein said alloy consists of Fe at 55.5 to 71.5 wt. %; B at 0.5 to 3.0 wt. %; Cr at 15.0 to 20.0 wt. %; Si at 2.0 to 5.0 wt. %; Ni at 11.0 to 15.0 wt. %; optionally C in an amount up to 0.5 wt. %, and unavoidable impurities.

6. The method of claim 1 wherein said alloy consists of Fe at 55.5 to 75.2 wt. %; B at 0.5 to 3.0 wt. %; Cr at 17.0 to 22.0 wt. %; Mn at 0.3 to 3.0 wt. %; Si at 2.0 to 5.0 wt. %; Ni at 5.0 to 10.0 wt. %; optionally C in an amount up to 0.5 wt. %; and unavoidable impurities.

7. The method of claim 1 wherein said alloy consists of Fe at 54.5 to 69.5 wt. %; B at 0.5 to 3.0 wt. %; Cr at 16.5 to 20.5 wt. %; Mn at 1.0 to 2.5 wt. %; Si at 2.0 to 5.0 wt. %; Ni at 10.5 to 14.0 wt. %; optionally C in an amount up to 0.5 wt. %; and unavoidable impurities.

8. The method of claim 1 wherein said metallic part comprises a pump or pump parts, valve, mold, bearing, cutting tool, filter, or screen.

9. The method of claim 1, wherein said particles have a diameter of 15.0 to 70.0 microns.

10. The method of claim 1, wherein said particles have a diameter of 20.0 to 45.0 microns.

11. The method of claim 1, wherein heat treating said one or more layers of said alloy is performed in a vacuum atmosphere.

12. The method of claim 1, wherein heat treating said one or more layers of said alloy is performed in an inert gas atmosphere.

13. The method of claim 1, wherein heat treating said one or more layers of said alloy is performed in a reducing gas atmosphere.

14. The method of claim 1, wherein said alloy consists of one of the following compositions (a) or (b):
  (a) Fe at 54.5 to 69.5 wt. %; B at 0.5 to 3.0 wt. %; Cr at 16.5 to 20.5 wt. %; Mn at 1.0 to 2.5 wt. %; Si at 2.0 to 5.0 wt. %; C at 0.0 to 0.5 wt. %; Ni at 10.5 to 14.0 wt. %, and inevitable impurities;
  (b) Fe at 55.5 to 75.2 wt. %; B at 0.5 to 3.0 wt. %; Cr at 17.0 to 22.0 wt. %; Mn at 0.3 to 3.0 wt. %; Si at 2.0 to 5.0 wt. %; C at 0.0 to 0.5 wt. %; and Ni at 5.0 to 10.0 wt. %, and inevitable impurities.

15. The method of claim 1, wherein melting said particles of said alloy into a molten state is performed with a laser or an electron beam.

* * * * *